(12) United States Patent
Huang

(10) Patent No.: US 8,441,151 B2
(45) Date of Patent: May 14, 2013

(54) POWER SUPPLY WITH ARC FLASH PROTECTION MECHANISM AND DATA-PROCESSING SYSTEM EMPLOYING SAME

(75) Inventor: Yu-Hung Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 409 days.

(21) Appl. No.: 12/713,764

(22) Filed: Feb. 26, 2010

(65) Prior Publication Data
US 2011/0122663 A1    May 26, 2011

Related U.S. Application Data

(60) Provisional application No. 61/263,895, filed on Nov. 24, 2009, provisional application No. 61/266,627, filed on Dec. 4, 2009.

(51) Int. Cl.
*H01H 31/34* (2006.01)
*H01H 47/02* (2006.01)
*H02J 7/22* (2006.01)

(52) U.S. Cl.
USPC ............................................. 307/97; 363/50

(58) Field of Classification Search ...................... 363/50
See application file for complete search history.

(56) References Cited

U.S. PATENT DOCUMENTS

| | | | | |
|---|---|---|---|---|
| 4,034,172 A * | 7/1977 | Glover et al. | ................ | 200/51.1 |
| 5,336,934 A * | 8/1994 | Toepfer et al. | ................ | 307/10.1 |
| 5,952,741 A * | 9/1999 | Toy | ................ | 307/326 |
| 6,746,250 B2 * | 6/2004 | Blutbacher | ................ | 439/34 |
| 7,021,950 B2 * | 4/2006 | Borrego Bel et al. | ......... | 439/181 |
| 2004/0192092 A1 * | 9/2004 | Borrego Bel et al. | ......... | 439/181 |
| 2009/0206792 A1 * | 8/2009 | Hyatt | ............................ | 320/114 |
| 2009/0295232 A1 * | 12/2009 | McGinley et al. | ............ | 307/126 |

FOREIGN PATENT DOCUMENTS

| JP | 09046564 | * | 2/1997 |
|---|---|---|---|
| JP | 2008065364 | * | 3/2008 |

* cited by examiner

*Primary Examiner* — Carlos Amaya
(74) *Attorney, Agent, or Firm* — Kirton McConkie; Evans R. Witt

(57) ABSTRACT

A power supply with arc flash protection mechanism for providing power to a load is disclosed. The power supply comprises a first power connector including a plurality of power terminals and a first detecting terminal, a power conversion circuit, a control unit and a connection status detection circuit. The power terminals of the first power connector are configured to couple with a plurality of power terminals of a second power connector, and the first detecting terminal is configured to couple with a second detecting terminal of the second power connector and provide a detecting signal indicative of whether the second power connector is being disconnected with the first power connector. When the first detecting terminal is disconnected with the second detecting terminal, a power connection status signal of the connection status detection circuit is under disable status and the control unit controls the power conversion circuit not to generate or output the output voltage to the load.

40 Claims, 13 Drawing Sheets

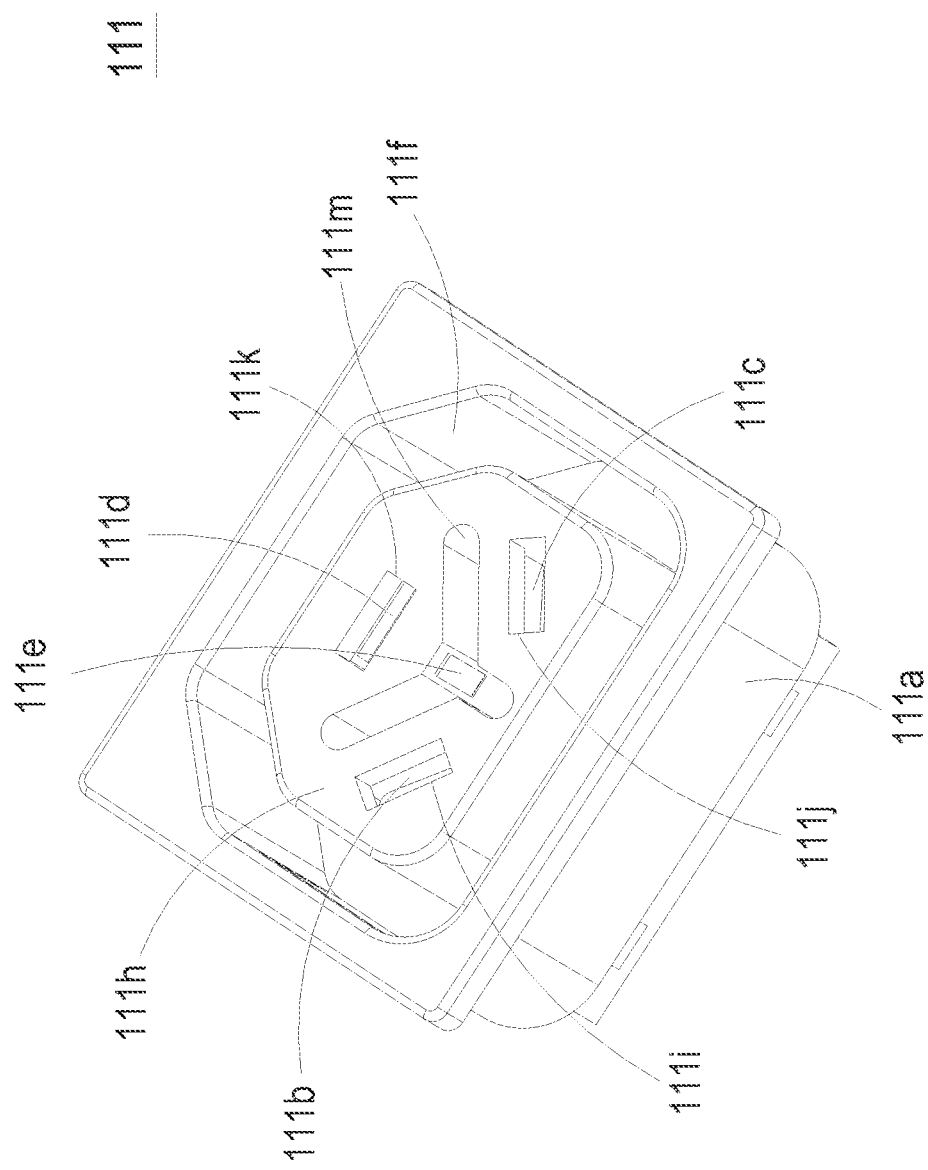

POWER SUPPLY WITH ARC FLASH PROTECTION MECHANISM AND DATA-PROCESSING SYSTEM EMPLOYING SAME

CROSS-REFERENCE TO RELATED APPLICATIONS

This application claims the benefit of prior U.S. provisional application 61/263,895, which is entitled "INTELLIGENT POWER CONNECTOR ASSEMBLY CAPABLE OF PREVENTING GENERATION OF ARC FLASH" and filed Nov. 24, 2009, and claims the benefit of prior U.S. provisional application 61/266,627, which is entitled "ARC FLASH PROTECTION MECHANISM FOR POWER SUPPLY AND DATA-PROCESSING SYSTEM EMPLOYING SAME" and filed Dec. 4, 2009.

FIELD OF THE INVENTION

The present invention relates to a protection mechanism for power supply, and more particularly to an arc flash protection mechanism for power supply and a data-processing system employing the same.

BACKGROUND OF THE INVENTION

With increasing industrial development, diverse electronic equipments are used to achieve various purposes. An electronic equipment comprises a plurality of electronic components. Generally, different kinds of electronic components are operated by using different voltages.

As known, a power supply is essential for many electronic equipments such as personal computers, industrial computers, servers, communication products or network products. Usually, the user may couple a socket of a power supply to a plug of a power cord (i.e. external power source) so as to receive an AC voltage input or DC voltage input. The power supply will convert the input power into a desired output power for powering the electronic equipment.

For general power transmission systems, power distribution systems and electronic equipments, an instant spark may be generated at the switch contacts due to the electric current flowing therethrough, and the electric arc between the two contacts will melt the switch contacts, which causes damages to the electronic equipment. Moreover, in the power supply, when the input plug of an external power source is contacted with or pulled out from the socket of the power supply, an electric arc may also be resulted and the electronic equipment is accordingly damaged.

Currently, different kinds of electromagnetic arc-suppressing devices, heat-operated arc-suppressing devices or air circuit breakers are used to suppress arc generation. Alternatively, the contacts are covered by current-withstanding alloy and insulating material to prevent damages to the contacts and damages to human bodies. However, these solutions require a certain space and high cost, and are not suitable to be used for the power supply with high power density.

In addition, power supplies are important elements for providing desired power to the electronic equipments of a data-processing system, for example data-processing equipments of a data center. In order to prevent the damages to the system due to the unintentional or accidental interruption of power, a power cord latching or retaining structure is employed to anchor the power cord on the power supply so as to prevent the plug of the power cord from loosening and dropping from the socket of the power supply and prevent the generation of arc flash due to high electric current flowing through the contacts of the connectors. However, it is still an unsafe protection mechanism to prevent the system from shutting down or damages due to arc flash and unintentional or accidental interruption of power.

To overcome the disadvantages of the prior art described above, there is a need to provide an arc flash protection mechanism for power supply and a data-processing system employing the same, so as to avoid damages from the electric arc and unintentional or accidental interruption of power-supplying.

SUMMARY OF THE INVENTION

It is an object of the present invention to provide a power supply with arc flash protection mechanism for preventing the generation of arc flash due to high electric current flowing through the contacts of the connectors and avoiding damages to the power supply or the data-processing equipments due to the electric arc and unintentional or accidental interruption of power-supplying.

Another object of the present invention provides a power connector assembly capable of preventing the generation of arc flash due to high electric current flowing through the contacts of the connectors and reducing the cost.

In accordance with an aspect of the present invention, there is provided a power supply with arc flash protection mechanism. The power supply comprises a first power connector, a power conversion circuit, a control unit and a connection status detection circuit. The first power connector includes a plurality of power terminals and a first detecting terminal, wherein the power terminals are configured to couple with a plurality of power terminals of a second power connector, and the first detecting terminal is configured to couple with a second detecting terminal of the second power connector and provide a detecting signal indicative of whether the second power connector is being disconnected with the first power connector. The power conversion circuit is electrically coupled to the power terminals of the first power connector for receiving an input voltage and converting the input power into an output voltage. The control unit is electrically coupled to the power conversion circuit for controlling the operation of the power conversion circuit. The connection status detection circuit is electrically coupled to the control unit and the first detecting terminal of the first power connector for generating a power connection status signal to the control unit according to the detecting signal. When the first detecting terminal of the first power connector is disconnected with the second detecting terminal of the second power connector, the power connection status signal is under disable status and the control unit controls the power conversion circuit not to generate or output the output voltage to a load according to the power connection status signal.

In accordance with another aspect of the present invention, there is provided a power connector assembly. The power connector assembly comprises a first power connector and a second power connector. The first power connector includes a plurality of power terminals and a first detecting terminal. The second power connector is configured to couple with the first power connector and includes a plurality of power terminals and a second detecting terminal. The power terminals of the first power connector are configured to couple with the power terminals of the second power connector, and the first detecting terminal of the first power connector is configured to couple with the second detecting terminal of the second power connector and provide a detecting signal indicative of whether the second power connector is being disconnected with the first power connector.

In accordance with a further aspect of the present invention, there is provided a power supply with arc flash protection mechanism for providing power to a load. The power supply comprises a first power connector, a power conversion circuit, a first hot-plug connector, a control unit and a connection status detection circuit. The first power connector includes a plurality of power terminals and a first detecting terminal, wherein the power terminals are configured to couple with a plurality of power terminals of a second power connector, and the first detecting terminal is configured to couple with a second detecting terminal of the second power connector and provide a detecting signal indicative of whether the second power connector is being disconnected with the first power connector. The power conversion circuit is electrically coupled to the power terminals of the first power connector for receiving an input voltage and converting the input power into an output voltage. The first hot-plug connector is electrically coupled to the power conversion circuit and includes a plurality of power pins, a first detecting pin and a first connection pin, wherein the power pins are configured to couple with a plurality of power pins of a second hot-plug connector of the load, the first detecting pin is configured to couple with a second detecting pin of the second hot-plug connector, the first connection pin is configured to couple with a second connection pin of the second hot-plug connector, and the second detecting pin is connected with the second connection pin. The control unit is electrically coupled to the power conversion circuit for controlling the operation of the power conversion circuit. The connection status detection circuit is electrically coupled to the control unit and electrically coupled to the first detecting terminal of the first power connector via a connection loop of the first connection pin, the second connection pin, the second detecting pin and the first detecting pin for generating a power connection status signal to the control unit according to the detecting signal. When the first detecting terminal of the first power connector is disconnected with the second detecting terminal of the second power connector or the first hot-plug connector is disconnected with the second hot-plug connector, the power connection status signal is under disable status and the control unit controls the power conversion circuit not to generate or output the output voltage to the load according to the power connection status signal.

In accordance with another aspect of the present invention, there is provided a data-processing system. The data-processing system comprises a data-processing equipment and a power supply electrically coupled to the data-processing equipment. The power supply comprises a first power connector, a power conversion circuit, a control unit and a connection status detection circuit. The first power connector includes a plurality of power terminals and a first detecting terminal, wherein the power terminals are configured to couple with a plurality of power terminals of a second power connector, and the first detecting terminal is configured to couple with a second detecting terminal of the second power connector and provide a detecting signal indicative of whether the second power connector is being disconnected with the first power connector. The power conversion circuit is electrically coupled to the power terminals of the first power connector for receiving an input voltage and converting the input power into an output voltage. The control unit is electrically coupled to the power conversion circuit for controlling the operation of the power conversion circuit. The connection status detection circuit is electrically coupled to the control unit and the first detecting terminal of the first power connector for generating a power connection status signal to the control unit according to the detecting signal. When the first detecting terminal of the first power connector is disconnected with the second detecting terminal of the second power connector, the power connection status signal is under disable status and the control unit controls the power conversion circuit not to generate or output the output voltage to the data-processing equipment according to the power connection status signal.

The above contents of the present invention will become more readily apparent to those ordinarily skilled in the art after reviewing the following detailed description and accompanying drawings, in which:

BRIEF DESCRIPTION OF THE DRAWINGS

FIG. 5A is a schematic diagram showing the first power connector of a further preferred embodiment of the power connector assembly;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
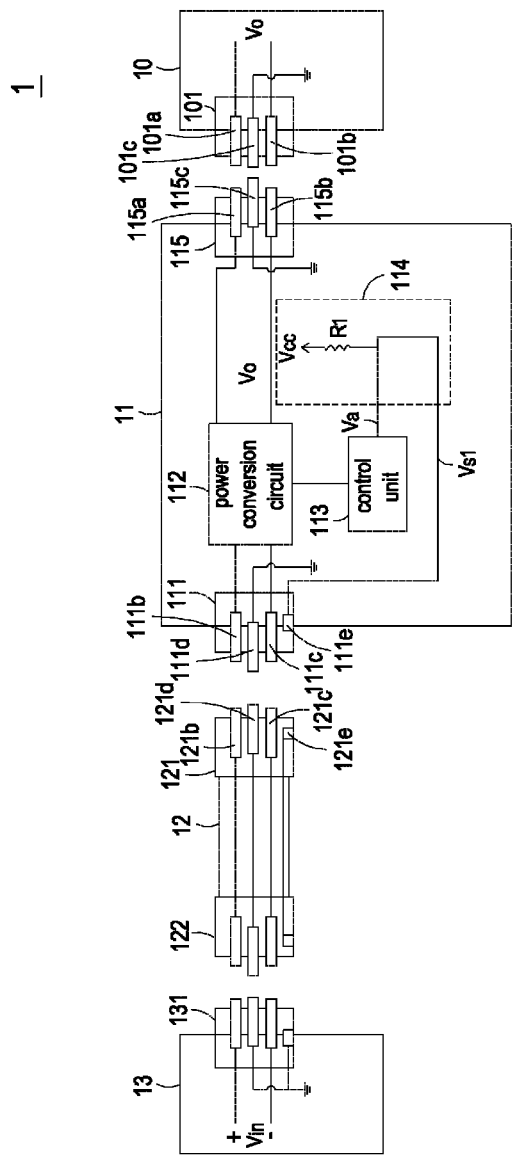
FIG. 1 is a circuit block diagram showing a power supply with arc flash protection mechanism used for a data-processing system according to the preferred embodiment of the present invention.
Figure 2:
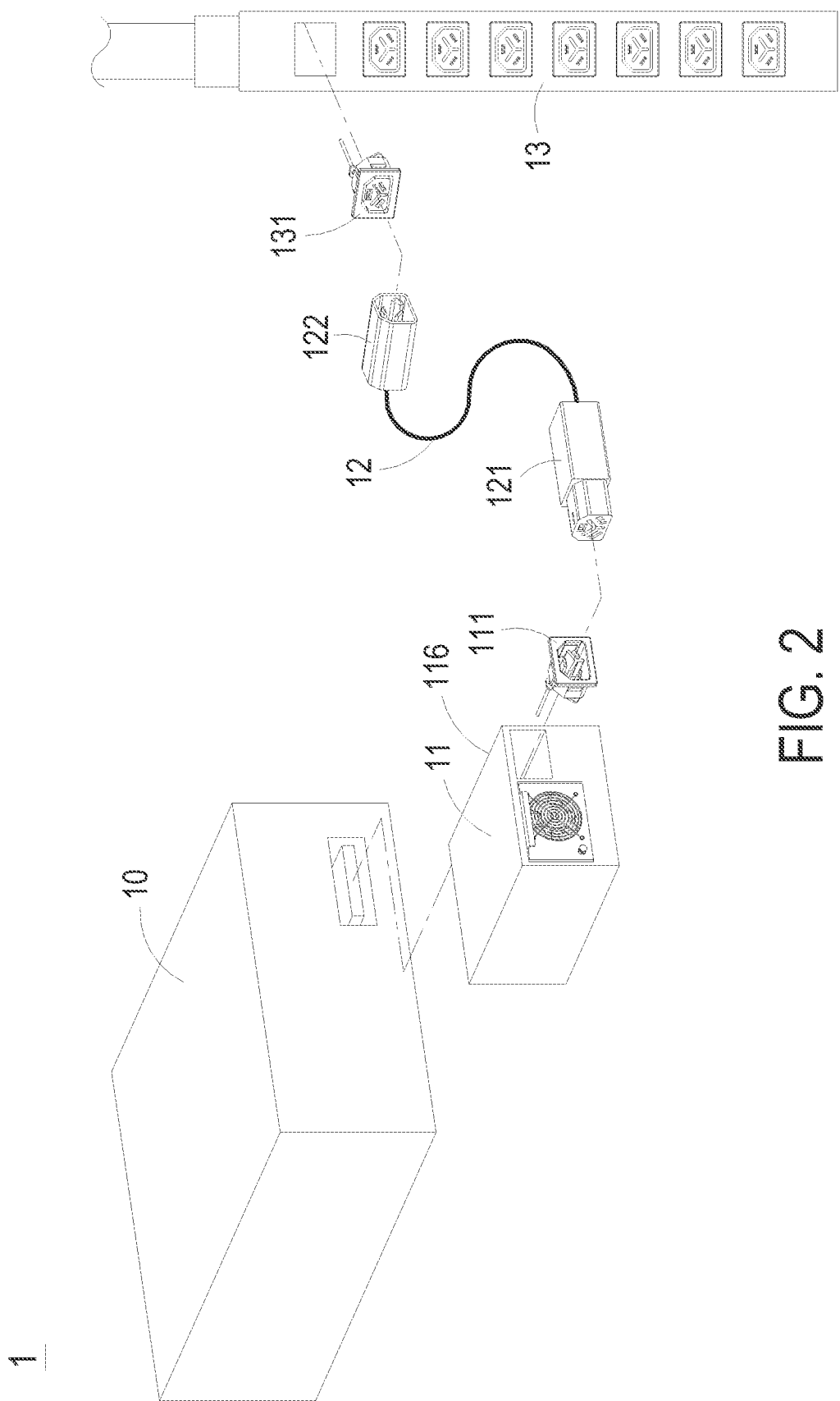
FIG. 2 is a schematic diagram of FIG. 1.

FIG. 1 is a circuit block diagram showing a power supply with arc flash protection mechanism used for a data-processing system according to the preferred embodiment of the present invention; and FIG. 2 is a schematic diagram of FIG.

1 according to the preferred embodiment of the present invention. As shown in FIGS. 1 and 2, the data-processing system 1 comprises one or more data-processing equipments 10, for example one or more servers. The data-processing equipment 10 is electrically coupled with one or more power supplies 11 and supplied power by the one or more power supplies 11. For describing the technical features of the present invention briefly, in an embodiment, the data-processing equipment 10 is electrically coupled to the power supply 11 and supplied power by the power supply 11. The power supply 11 with arc flash protection mechanism comprises a first power connector 111 (i.e. socket), a power conversion circuit 112, a control unit 113, a connection status detection circuit 114 and a first hot-plug connector 115 (i.e. power and signal transmission interface). The power supply 11 is employed for receiving an input voltage $V_{in}$ from a power distribution unit 13 (PDU) via a power cable 12 and converting the input voltage $V_{in}$ into output voltage $V_o$ so as to provide the output voltage $V_o$ to the data-processing equipment 10, for example rack server of a data center. The power cable 12 is coupled between the power distribution unit 13 and the power supply 11 and comprises a second power connector 121 (i.e. plug). The combination of the first power connector 111 and the second power connector 121 is defined as a power connector assembly. The first power connector 111 is disposed on a casing 116 of the power supply 11, which is electrically coupled to the data-processing equipment 10 of the data-processing system 1 and provides desired power to the data-processing equipment 10 through the first hot-plug connector 115 of the power supply 11 and a second hot-plug connector 101 of the data-processing equipment 10. The second power connector 121 is disposed on an end of the power cable 12. The first power connector 111 is configured to couple with the second power connector 121 to achieve the structural and electrical connections.

Figure 3A:
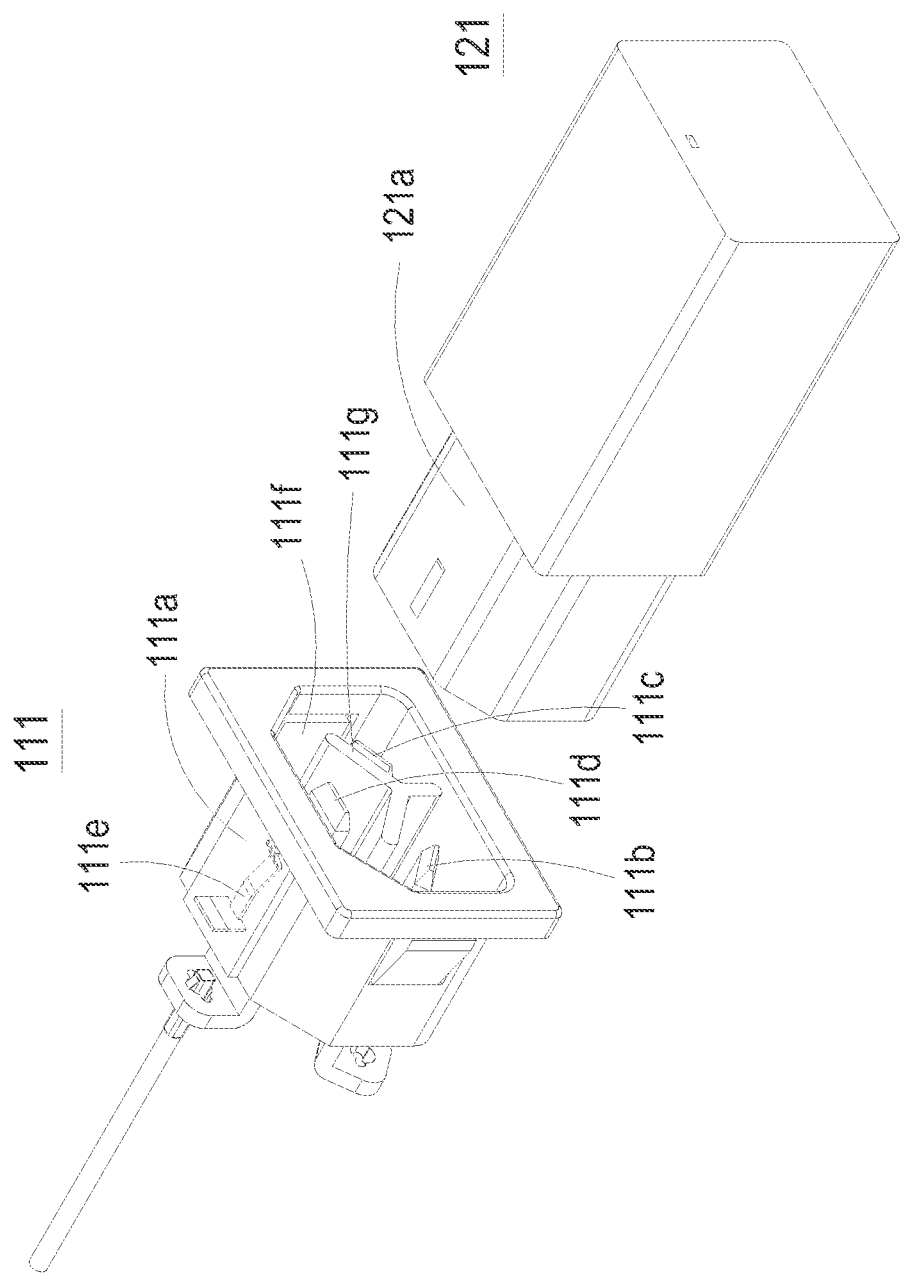
FIG. 3A is a schematic diagram showing the power connector assembly of FIGS. 1 and 2.
Figure 3B:
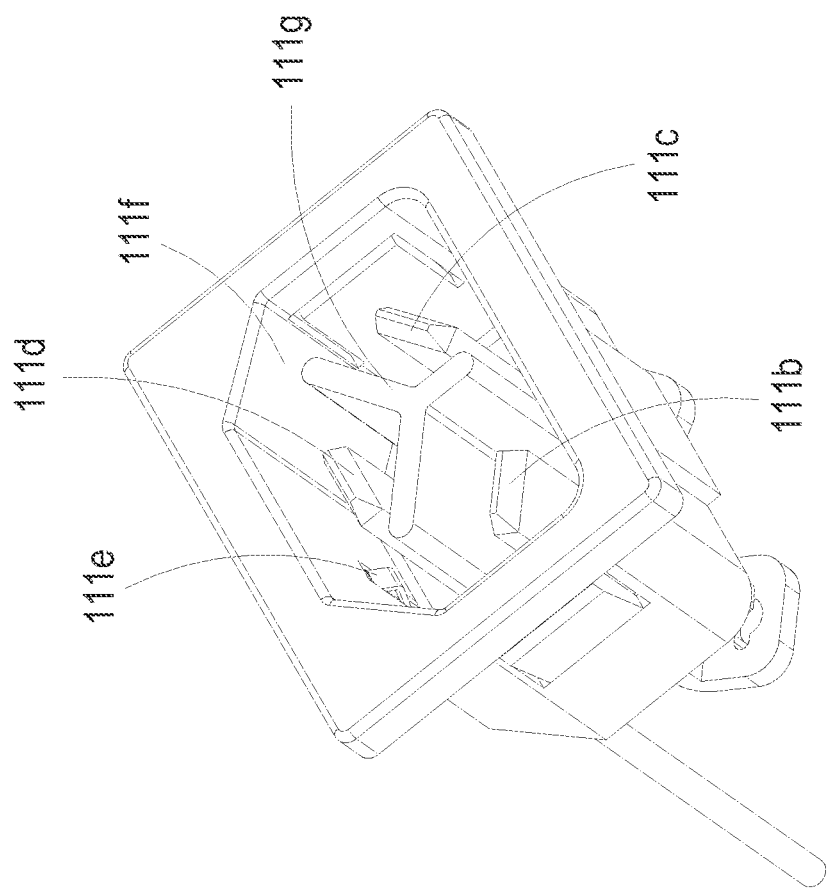
FIG. 3B is a schematic diagrams showing the first power connector of the power connector assembly of FIG. 3A.
Figure 3C:
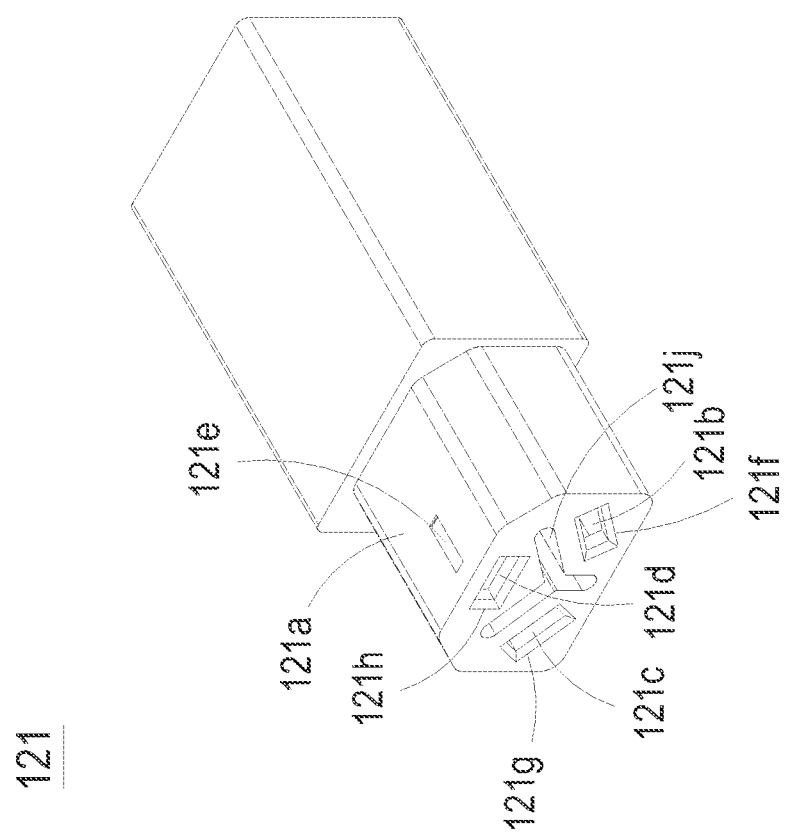
FIG. 3C is a schematic diagram showing the second power connector of the power connector assembly of FIG. 3A.

FIG. 3A is a schematic diagram showing the power connector assembly of FIGS. 1 and 2; FIG. 3B is a schematic diagrams showing the first power connector of the power connector assembly of FIG. 3A; and FIG. 3C is a schematic diagram showing the second power connector of the power connector assembly of FIG. 3A. As shown in FIGS. 3A, 3B and 3C, the first power connector 111 comprises a first main body 111a, a plurality of power terminals 111b, 111c, 111d (i.e. a first set of power terminals) and a first detecting terminal 111e (i.e. first contact element). The first main body 111a includes a receptacle 111f for receiving at least portion of the second power connector 121. In an embodiment, the first power connector 111 includes a first power terminal 111b, a second power terminal 111c, a third power terminal 111d and a first detecting terminal 111e. The first detecting terminal 111e has a contact portion extending outwardly from one inner sidewall of the receptacle 111f of the first main body 111a and has a connection portion extending outwardly from one external sidewall of the first main body 111a. The distance from the opening of the receptacle 111f to the contact portion of the first detecting terminal 111e is longer than that from the opening of the receptacle 111f to the free ends of the first power terminal 111b, the second power terminal 111c and the third power terminal 111d. Namely, the length of the first detecting terminal 111e is shorter than that of each power terminal 111b, 111c, 111d. The first power connector 111 further comprises an isolation partition 111g disposed in the middle area of the receptacle 111f for isolating and separating the power terminals 111b~111d with each other. The isolation partition 111g can be formed in the Y-Shaped. The connection portion of the first detecting terminal 111e of the first power connector 111 is coupled to the connection status detection circuit 114 via connection wire or trace for generating a first detecting signal (i.e. PS_Kill).

The second power connector 121 comprises a second main body 121a, a plurality of power terminals 121b, 121c, 121d (i.e. a second set of power terminals) and a second detecting terminal 121e. The second main body 121a includes a plural of power terminal openings 121f, 121g, 121h formed on a first surface thereof. The power terminals 121b, 121c, 121d are respectively disposed in a corresponding power terminal opening 121f, 121g, 121h. In an embodiment, the second power connector 121 includes a first power terminal 121b, a second power terminal 121c, a third power terminal 121d and a second detecting terminal 121e (i.e. second contact element). The second detecting terminal 121e has a contact portion extending outwardly from one external sidewall of the second main body 121a. Preferably, the distance from the end of the second detecting terminal 121e to the edge of the second main body 121a is longer than that from the end of the first power terminal 121b, the second power terminal 121c and the third power terminal 121d to the edge or the power terminal openings of the second main body 121a. Namely, the length of the second detecting terminal 121e is shorter than that of each power terminal 121b, 121c, 121d. The second power connector 121 further comprises a receptacle 121j disposed in the second main body 121a for receiving the isolation partition 111g of the first power connector 111. The second detecting terminal 121e is at a predetermined voltage level. In an embodiment, the second detecting terminal 121e has same voltage level with the third power terminal 121d, for example 0V. In an embodiment, the method to achieve that the second detecting terminal 121e has same voltage level with the third power terminal 121d can be performed by coupling the power connector 122 of the power cable 12 with the power connector 131 of the power distribution unit 13. In an embodiment, the first power terminal 121b, the second power terminal 121c and the third power terminal 121d are L(line) terminal, N(Neutral) terminal and FG(Ground) terminal, respectively. Alternatively, the first terminal 121b, the second terminal 121c and the third terminal 121d are positive (+) terminal, negative (−) terminal and FG terminal, respectively.

As shown in FIGS. 1, 2 and 3A~3C, when the second power connector 121 (i.e. plug) of the power cable 12 is being coupled to the first power connector 111 (i.e. socket) of the power supply 11, the first power terminal 111b, the second power terminal 111c and the third power terminal 111d of the first power connector 111 will firstly contact with the first power terminal 121b, the second power terminal 121c and the third power terminal 121d of the second power connector 121, respectively. Finally, the first detecting terminal 111e of the first power connector 111 contacts with the second detecting terminal 121e of the second power connector 121. Namely, the contacts and connections between the power terminals of the first power connector 111 and the second power connector 121 are prior to the contact and connection between the detecting terminals of the first power connector 111 and the second power connector 121. When the first power connector 111 is being coupled with the second power connector 121, the power and signal connecting and delivering between the first power connector 111 and the second power connector 121 will be the power ground, the positive voltage and the negative voltage firstly, and the first detecting signal (i.e. PS_Kill) in sequence. When the second power connector 121 is abnormal to be pulled out and removed from the first power connector 111, the first detecting terminal 111e of the first power connector 111 will be detached from or disconnected with the second detecting terminal 121e of the second power connector 121 firstly. Namely, the detachment between the detecting terminals of the first power connector 111 and the second power connector 121 is prior to the detachments between the power terminals of the first power connector 111 and the second power connector 121.

In an embodiment, the input terminal of the power conversion circuit 112 is electrically coupled to the power terminals 111b~111c of the first power connector 111, the output terminal of the power conversion circuit 112 is electrically coupled to the power pins 115a~115c (for example a first power pin 115a, a second power pin 115b and a third power pin 115c) of the first hot-plug connector 115, and the power conversion circuit 112 is employed for receiving the input voltage $V_{in}$ and converting the input voltage $V_{in}$ into the output voltage $V_o$. Therefore, the electric energy of the input voltage $V_{in}$ can be transmitted to the input terminal of the power conversion circuit 112 via the power terminals 111b, 111c, 111d of the first power connector 111, and the electric energy of the output voltage $V_o$ can be transmitted to the data-processing equipment 10 via the power pins 115a, 115b, 115c of the first hot-plug connector 115 and the power pins 101a, 101b, 101c of the second hot-plug connector 101. The control unit 113 is electrically coupled to the power conversion circuit 112 for controlling the operations of the power conversion circuit 112.

The connection status detection circuit 114 is electrically coupled to the control unit 113 and the first detecting terminal 111e of the first power connector 111 for detecting the power connection status of the first power connector 111 and generating a power connection status signal Va correspondingly. In an embodiment, the connection status detection circuit 114 can detect only the power connection status of the first power connector 111 and comprises a first pull-up resistor $R_1$ (i.e. current-limiting circuit) electrically connected between an auxiliary voltage $V_{cc}$, for example 3.3V and the first detecting terminal 111e of the first power connector 111. The auxiliary voltage $V_{cc}$ is a DC voltage source, which may be provided from the power conversion circuit 112 of the power supply 11.

In accordance with one aspect of the present invention, when the first power connector 111 is connected to the second power connector 121, the power terminals 111b~111d of the first power connector 111 will firstly contact with the power terminals 121b~121d of the second power connector 121. Thereafter, the first detecting terminal 111e of the first power connector 111 contacts with the second detecting terminal 121e of the second power connector 121. In addition, when the second power connector 121 is abnormal to be pulled out and removed from the first power connector 111, the first detecting terminal 111e of the first power connector 111 will be detached from and disconnected with the second detecting terminal 121e of the second power connector 121 firstly. Thereafter, the power terminals 111b~111d of the first power connector 111 are detached from and disconnected with the power terminals 121b~121d of the second power connector 121.

In an embodiment, when the first power connector 111 of the power supply 11 is disconnected with the second power connector 121 of the power cable 12, the first detecting terminal 111e of the first power connector 111 provides a first detecting signal $V_{s1}$ under a disable status, for example high voltage level 3.3V, that is used to detect when the first power connector 111 is being removed or disconnected with the second power connector 121. Correspondingly, the connection status detection circuit 114 generates a power connection status signal $V_a$ under a disable status to the control unit 113 in response to the first detecting signal $V_{s1}$. Therefore, the control unit 113 determines that the first power connector 111 is disconnected with the second power connector 121 according to the power connection status signal $V_a$ and controls the power conversion circuit 112 not to generate or output the output voltage $V_o$.

In an embodiment, when the second power connector 121 of the power cable 12 is being coupled to first power connector 111 of the power supply 11, the power terminal 121b, 121c, 121d of the second power connector 121 will firstly contact with the power terminal 111b, 111c, 111d of the first power connector 111. At this moment, the first detecting signal $V_{s1}$ and the power connection status signal $V_a$ are under disable status, and the control unit 113 determines that the first power connector 111 is disconnected with the second power connector 121 according to the power connection status signal $V_a$ and controls the power conversion circuit 112 not to generate or output the output voltage $V_o$. Therefore, there is no electric current flowing between the contacts of the power connectors so that the generation of arc flash between the contacts of the power connectors will be prevented and the damages to the power supply or the data-processing system will be prevented. When the second power connector 121 of the power cable 12 is still and further coupled to the first power connector 111 of the power supply 11 and when the first detecting terminal 111e of the first power connector 111 contacts with the second detecting terminal 121e of the second power connector 121, the first detecting signal $V_{s1}$ and the power connection status signal Va are changed from the disable statuses to an enabled statuses, for example changing from a higher voltage level 3.3V to a lower voltage level 0V. The control unit 113 determines that the second power connector 121 is coupled with the first power connector 111 totally and securely and controls the power conversion circuit 112 to operate to generate or output the output voltage $V_o$.

In an embodiment, when the second power connector 121 of the power cable 12 is being detached and removed from the first power connector 111 of the power supply 11, the second detecting terminal 121e is detached from and disconnected with the first detecting terminal 111e firstly. At this moment, the first detecting signal $V_{s1}$ of the first detecting terminal 111e and the power connection status signal $V_a$ of the connection status detection circuit 114 will be changed from the enabled statuses to the disable statuses, and the control unit 113 determines that the second power connector 121 is detached from and disconnected with the first power connector 111 or the user would like to separate the second power connector 121 from the first power connector 111 and controls the power conversion circuit 112 not to operate to generate or output the output voltage $V_o$. Therefore, there is no electric current flowing between the contacts of the power connectors. Thereafter, the power terminals 121b~121d of the second power connector 121 will be detached from and disconnected with the power terminals 111b~111d of the first power connector 111 so that the generation of arc flash between the contacts of the power connectors will be prevented and the damages to the power supply or the data-processing system will be prevented.

In an embodiment, the power connector assembly of the first power connector 111 and the second power connector 121 also can be employed for the connection between the power supply 11 and the data-processing equipment 10 or employed for the connection between the power distribution unit 13 and the power cable 12. As shown in FIG. 1, the power distribution unit 13 has a power connector 131 and the power cable 12 has a mating power connector 122. The power connector assembly can also be employed to prevent arc flash generation. The operating functions of the power connector assembly of the power connector 131 and the power connector 122 employed for the power distribution unit 13 and the power cable 12 is identical to the power connector assembly of the first power connector 111 and the second power connector 121 employed for the power cable 12 and the power supply 11 as shown in FIGS. 1, 2 and 3A~3C, and are not redundantly described herein.

Figure 4A:
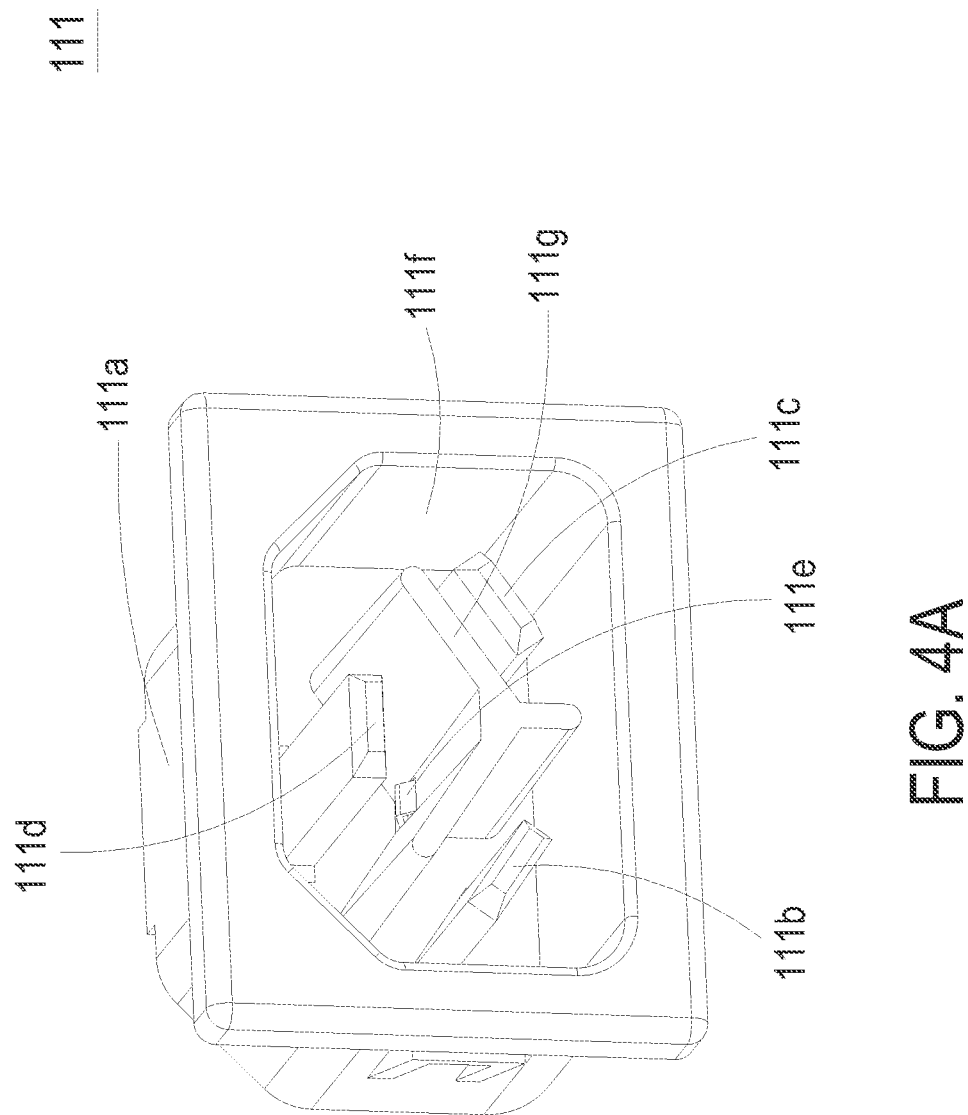
FIG. 4A is a schematic diagram showing the first power connector of another preferred embodiment of the power connector assembly.
Figure 4B:
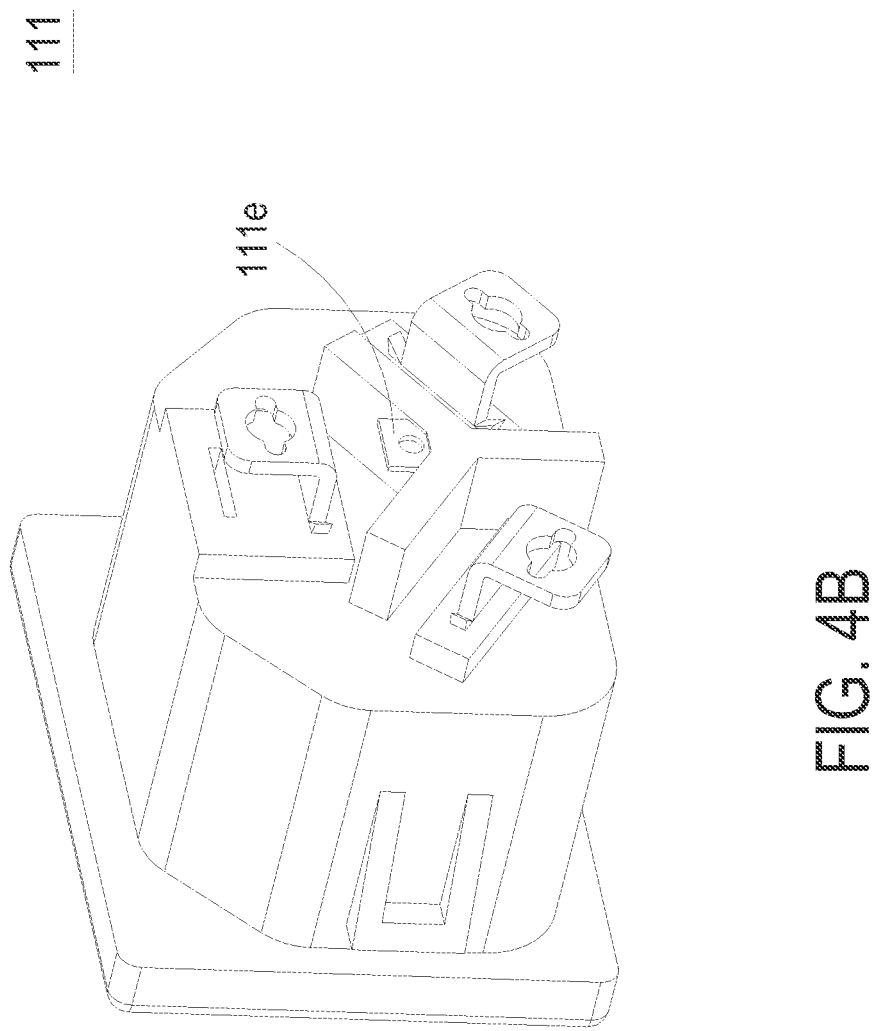
FIG. 4B is a schematic backside view showing the first power connector of the power connector assembly of FIG. 4A.
Figure 4C:
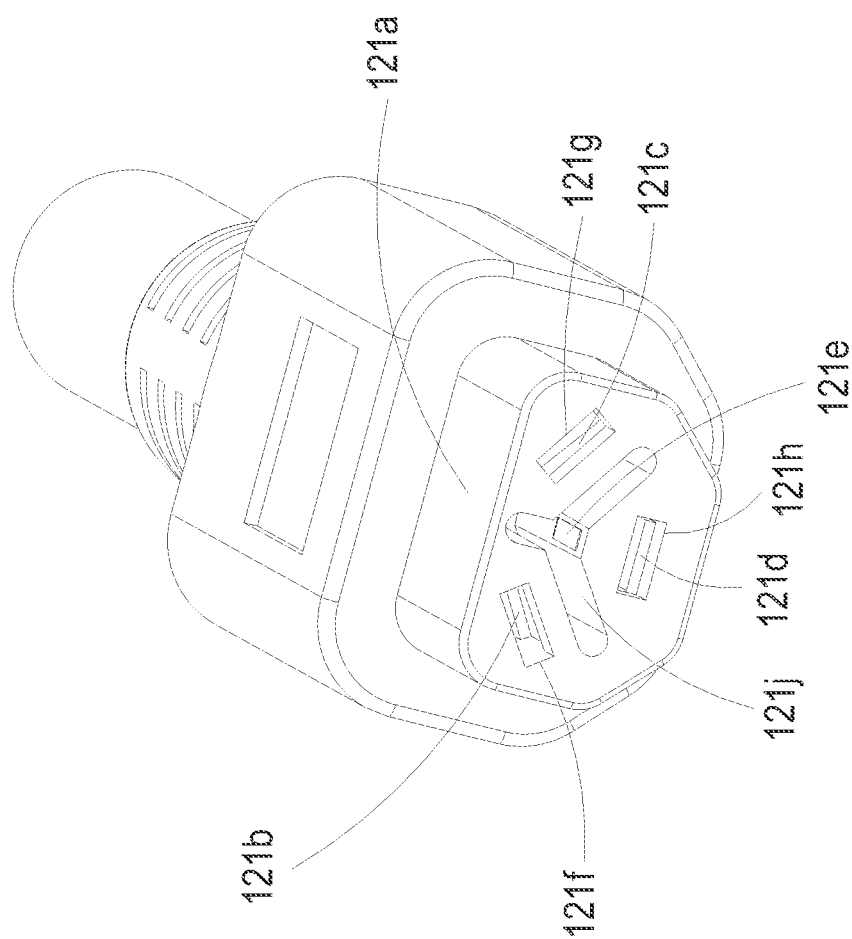
FIG. 4C is a schematic diagram showing the second power connector of the power connector assembly mating with the first power connector of FIG. 4A.

FIG. 4A is a schematic diagram showing the first power connector of another preferred embodiment of the power connector assembly; FIG. 4B is a schematic backside view showing the first power connector of the power connector assembly of FIG. 4A; and FIG. 4C is a schematic diagram showing the second power connector of the power connector assembly mating with the first power connector of FIG. 4A. As shown in FIGS. 4A, 4B and 4C, the first power connector 111 comprises a first main body 111a, a plurality of power terminals 111b, 111c, 111d (i.e. a first set of power terminals) and a first detecting terminal 111e (i.e. first contact element). The first main body 111a includes a receptacle 111f for receiving at least portion of the second power connector 121. In an embodiment, the first power connector 111 includes a first power terminal 111b, a second power terminal 111c, a third power terminal 111d and a first detecting terminal 111e. The first power connector 111 further comprises an isolation partition 111g disposed in the middle area of the receptacle 111f for isolating and separating the power terminals 111b~111d with each other. The isolation partition 111g can be formed in the Y-Shaped. The first detecting terminal 111e has a contact portion extending outwardly from the outline of the isolation partition 111g of the first main body 111a and has a connection portion extending outwardly from one external sidewall of the first main body 111a. The distance from the opening of the receptacle 111f to the contact portion of the first detecting terminal 111e is longer than that from the opening of the receptacle 111f to the free ends of the first power terminal 111b, the second power terminal 111c and the third power terminal 111d. Namely, the length of the first detecting terminal 111e is shorter than that of each power terminal 111b, 111c, 111d. The connection portion of the first detecting terminal 111e of the first power connector 111 is coupled to the connection status detection circuit 114 via connection wire or trace for generating a first detecting signal (i.e. PS_Kill).

The second power connector 121 comprises a second main body 121a, a plurality of power terminals 121b, 121c, 121d (i.e. a second set of power terminals) and a second detecting terminal 121e. The second main body 121a includes a plural of power terminal openings 121f, 121g, 121h formed on a first surface thereof. The power terminals 121b, 121c, 121d are respectively disposed in a corresponding power terminal opening 121f, 121g, 121h. In an embodiment, the second power connector 121 includes a first power terminal 121b, a second power terminal 121c, a third power terminal 121d and a second detecting terminal 121e (i.e. second contact element). The second power connector 121 further comprises a receptacle 121j disposed in the second main body 121a for receiving the isolation partition 111g of the first power connector 111. The second detecting terminal 121e has a contact portion extending outwardly from one inner sidewall of the receptacle 121j. Preferably, the distance from the end of the second detecting terminal 121e to the opening of the receptacle 121j of the second main body 121a is longer than that from the end of the first power terminal 121b, the second power terminal 121c and the third power terminal 121d to the power terminal openings of the second main body 121a. Namely, the length of the second detecting terminal 121e is shorter than that of each power terminal 121b, 121c, 121d.

Figure 5B:
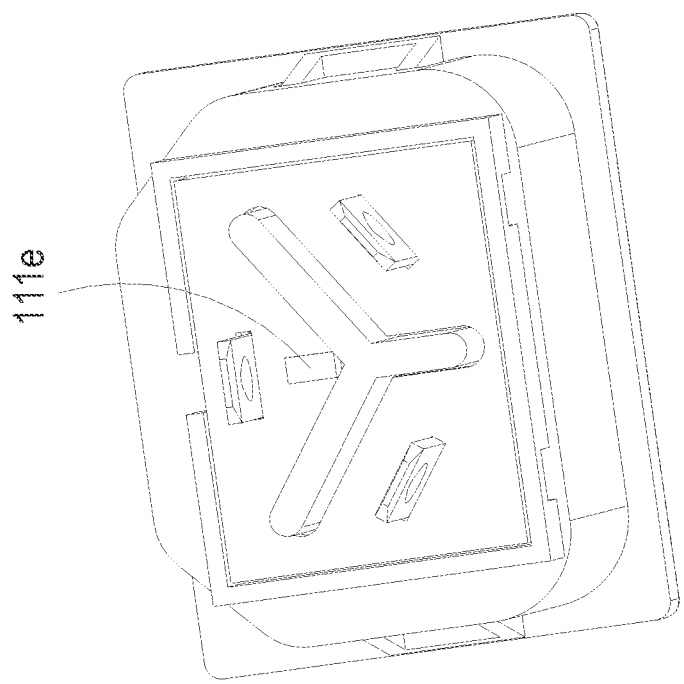
FIG. 5B is a schematic backside view showing the first power connector of the power connector assembly of FIG. 5A.
Figure 5C:
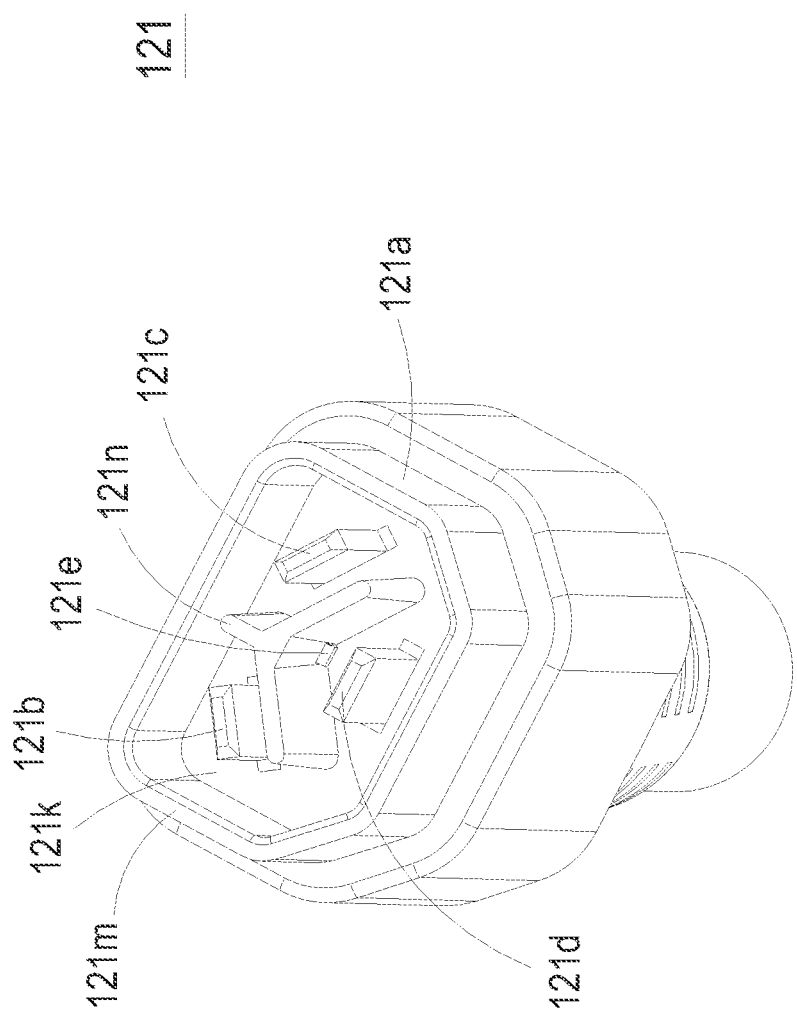
FIG. 5C is a schematic diagram showing the second power connector of the power connector assembly mating with the first power connector of FIG. 5A.

FIG. 5A is a schematic diagram showing the first power connector of another preferred embodiment of the power connector assembly; FIG. 5B is a schematic backside view showing the first power connector of the power connector assembly of FIG. 5A; and FIG. 5C is a schematic diagram showing the second power connector of the power connector assembly mating with the first power connector of FIG. 5A. As shown in FIGS. 5A, 5B and 5C, the first power connector 111 comprises a first main body 111a, a plurality of power terminals 111b, 111c, 111d (i.e. a first set of power terminals) and a first detecting terminal 111e (i.e. first contact element). The first main body 111a includes a receptacle 111f and a protrusion portion 111h disposed in the middle area of the receptacle 111f. The protrusion portion 111h includes a plural of power terminal openings 111i, 111j, 111k formed on a first surface thereof. The power terminals 111b, 111c, 111d are respectively disposed in a corresponding power terminal opening 111i, 111j, 111k. In an embodiment, the first power connector 111 includes a first power terminal 111b, a second power terminal 111c, a third power terminal 111d and a first detecting terminal 111e (i.e. first contact element). The protrusion portion 111h further comprises a receptacle 111m disposed in the middle area thereof for receiving an isolation partition of the second power connector 121. The first detecting terminal 111e has a contact portion extending outwardly from one inner sidewall of the receptacle 111m. Preferably, the distance from the opening of the receptacle 111m to the contact portion of the first detecting terminal 111e is longer than that from the power terminal openings 111i, 111j, 111k to the free ends of the first power terminal 111b, the second power terminal 111c and the third power terminal 111d. Namely, the length of the first detecting terminal 111e is shorter than that of each power terminal 111b, 111c, 111d. The connection portion of the first detecting terminal 111e of the first power connector 111 is coupled to the connection status detection circuit 114 via connection wire or trace for generating a first detecting signal (i.e. PS_Kill).

The second power connector 121 comprises a second main body 121a, a plurality of power terminals 121b, 121c, 121d (i.e. a second set of power terminals) and a second detecting terminal 121e. The second main body 121a includes a first power terminal 121b, a second power terminal 121c, a third power terminal 121d and a second detecting terminal 121e. The second power connector 121 further comprises a receptacle 121k, a sidewall 121m and an isolation partition 121n disposed in the middle area of the receptacle 121k for isolating and separating the power terminals 121b~121d with each other. The isolation partition 121n can be formed in the Y-shaped. The second detecting terminal 121e has a contact portion extending outwardly from the outline of the isolation partition 121n. Preferably, the distance from the end of the second detecting terminal 121e to the edge of the second main body 121a (i.e. the edge of the sidewall 121m or the edge of the isolation partition 121n) is longer than that from the end of the first power terminal 121b, the second power terminal 121c and the third power terminal 121d to the edge of the second main body 121a (i.e. the edge of the sidewall 121m or the edge of the isolation partition 121n). Namely, the length of the second detecting terminal 121e is shorter than that of each power terminal 121b, 121c, 121d.

Figure 6:
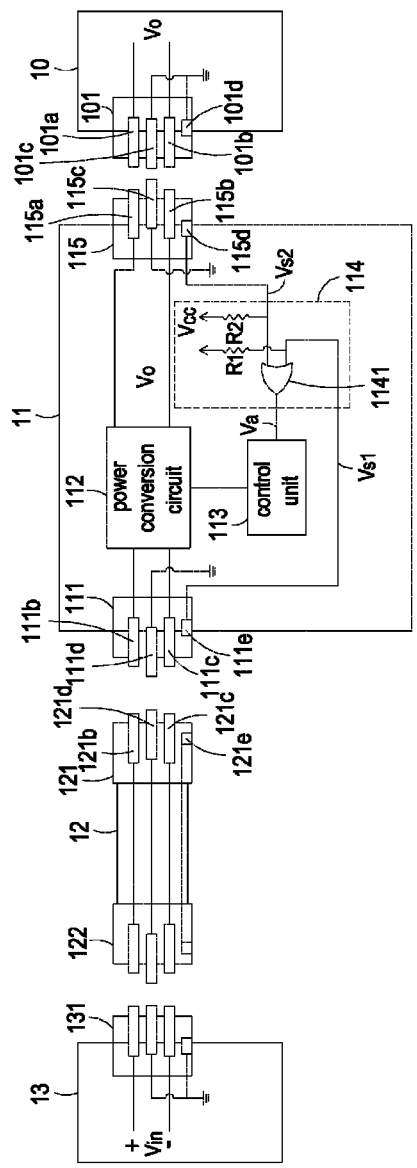
FIG. 6 is a circuit block diagram showing a power supply with arc flash protection mechanism used for a data-processing system according to a second preferred embodiment of the present invention.

FIG. 6 is a circuit block diagram showing a power supply with arc flash protection mechanism used for a data-processing system according to a second preferred embodiment of the present invention. As shown in FIGS. 2, 3A~3C and 6, the first hot-plug connector 115 of the power supply 11 and the second hot-plug connector 101 of the data-processing equipment 10 employ similar concepts with the power connector assembly of the first power connector 111 and the second power connector 121. In this embodiment, the first hot-plug connector 115 comprises a first set of power pins 115a, 115b, 115c (for example a first power pin 115a, a second power pin 115b and a third power pin 115c) and a first detecting pin 115d, and the second hot-plug connector 101 comprises a second set of power pins 101a, 101b, 101c (for example a first power pin 101a, a second power pin 101b and a third power pin 101c) and a second detecting pin 101d. When the first hot-plug connector 115 is being coupled with the second hot-plug connector 101, the first set of power pins 115a~115c of the first hot-plug connector 115 will firstly contact with the second set of power pins 101a~101c of the second hot-plug connector 101. Thereafter, the first detecting pin 115d of the first hot-plug connector 115 contacts with the second detecting pin 101d of the second hot-plug connector 101. In addition, when the first hot-plug connector 115 is being detached from or disconnected with the second hot-plug connector 101, the first detecting pin 115d of the first hot-plug connector 115 will be detached from and disconnected with the second detecting pin 101d of the second hot-plug connector 101, firstly. Thereafter, the first set of power pins 115a~115c of the first hot-plug connector 115 are detached from and disconnected with the second set of power pins 101a~101c of the second hot-plug connector 101.

The connection status detection circuit 114 comprises a first pull-up resistor $R_1$, a second pull-up resistor $R_2$ and an OR logic circuit 1141. The second pull-up resistor $R_2$ is electrically coupled between an auxiliary voltage $V_{cc}$ and the first detecting pin 115d. The output terminal of the OR logic circuit 1141 is electrically coupled to the control unit 113. The first input terminal of the OR logic circuit 1141 is electrically coupled to the first detecting terminal 111e of the first power connector 111, and the second input terminal of the OR logic circuit 1141 is electrically coupled to the first detecting pin 115d of the first hot-plug connector 115.

In an embodiment, when either the first power connector 111 of the power supply 11 is being detached and removed from the second power connector 121 of the power cable 12 or the first hot-plug connector 115 is being detached and removed from the second hot-plug connector 101, the first detecting terminal 111e of the first power connector 111 will be detached from and disconnected with the second detecting terminal 121e of the second power connector 101 firstly or the first detecting pin 115d of the first hot-plug connector 115 will be detached from and disconnected with the second detecting pin 101d of the second hot-plug connector 101, firstly. At this moment, the first detecting terminal 111e of the first power connector 111 generates a first detecting signal $V_{s1}$ under a disable status, for example high voltage level 3.3V, or the first detecting pin 115d of the first hot-plug connector 115 generates a second detecting signal $V_{s2}$ under a disable status, for example high voltage level 3.3V. Correspondingly, the connection status detection circuit 114 generates a power connection status signal $V_a$ under a disable status to the control unit 113 in response to the first detecting signal $V_{s1}$ or the second detecting signal $V_{s2}$. Therefore, the control unit 113 determines that the first power connector 111 is detached from and disconnected with the second power connector 121 or the user would like to separate the first power connector 111 with the second power connector 121 and/or the first hot-plug connector 115 is detached from and disconnected with the second hot-plug connector 101 or the user would like to separate the first hot-plug connector 115 with the second hot-plug connector 101 according to the connection status signal $V_a$ and controls the power conversion circuit 112 not to generate or output the output voltage $V_o$. Therefore, there is no electric current flowing between the contacts of the power connectors 111, 121 and the contacts of the hot-plug connectors 115, 101. Thereafter, the power terminals 121b~121d of the second power connector 121 will be detached from and disconnected with the power terminals 111b~111d of the first power connector 111 or the power pins 115a~115c of the first hot-plug connector 115 will be detached from and disconnected with the power pins 101a~101c of the second hot-plug connector 101 so that the generation of arc flash between the contacts of the power connectors or the contacts of the hot-plug connectors will be prevented and the damages to the power supply or the data-processing system will be prevented.

Figure 7:
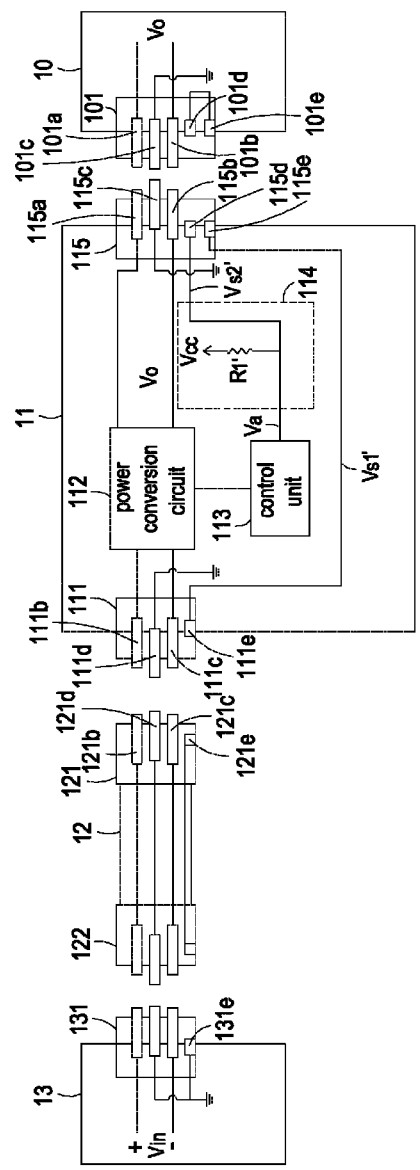
FIG. 7 is a circuit block diagram showing a power supply with arc flash protection mechanism used for a data-processing system according to a third preferred embodiment of the present invention.

FIG. 7 is a circuit block diagram showing a power supply with arc flash protection mechanism used for a data-processing system according to a third preferred embodiment of the present invention. As shown in FIGS. 2, 3A~3C and 7, the first hot-plug connector 115 comprises a first set of power pins 115a, 115b, 115c, a first detecting pin 115d and a first connection pin 115e, and the second hot-plug connector 101 comprises a second set of power pins 101a, 101b, 101c, a second detecting pin 101d and a second connection pin 101e, wherein the second detecting pin 101d is coupled to the second connection pin 101e. When the first hot-plug connector 115 is being coupled with the second hot-plug connector 101, the first set of power pins 115a~115c of the first hot-plug connector 115 will firstly contact with the second set of power pins 101a~101c of the second hot-plug connector 101. Thereafter, the first detecting pin 115d of the first hot-plug connector 115 contacts with the second detecting pin 101d of the second hot-plug connector 101 and the first connection pin 115e of the first hot-plug connector 115 contacts with the second connection pin 101e of the second hot-plug connector 101. In addition, when the first hot-plug connector 115 is being detached from or disconnected with the second hot-plug connector 101, the first detecting pin 115d of the first hot-plug connector 115 will be detached from and disconnected with the second detecting pin 101d of the second hot-plug connector 101 and the first connection pin 115e of the first hot-plug connector 115 will be detached from and disconnected with the second connection pin 101e of the second hot-plug connector 101, firstly. Thereafter, the first set of power pins 115a~115c of the first hot-plug connector 115 are detached from and disconnected with the second set of power pins 101a~101c of the second hot-plug connector 101. The first detecting pin 115d and the first connection pin 115e of the first hot-plug connector 115 are configured to connect with the second detecting pin 101d and the second connection pin 101e of the second hot-plug connector 101 respectively.

The connection status detection circuit 114 comprises a pull-up resistor R1'. The pull-up resistor R1' is electrically coupled between an auxiliary voltage and the first detecting pin 115d of the first hot-plug connector 115.

In an embodiment, when the first hot-plug connector 115 is coupled with the second hot-plug connector 101, the first set of power pins 115a~115c of the first hot-plug connector 115 contact with the second set of power pins 101a~101c of the second hot-plug connector 101, the first detecting pin 115d of the first hot-plug connector 115 contacts with the second detecting pin 101d of the second hot-plug connector 101, and the first connection pin 115e of the first hot-plug connector 115 contacts with the second connection pin 101e of the second hot-plug connector 101. At this moment, the first detecting terminal 111e of the first power connector 111 provides a first detecting signal $V_{s1}'$ (i.e. $V_{s1}'$ delivers the signal level from the detecting terminal 131e of the power connector 131 of the power distribution unit 13) under an enable status, for example low voltage level 0V, to the connection status detection circuit 114 via the connection path of the first connection pin 115*e*, the second connection pin 101*e*, the second detecting pin 101*d* and the first detecting pin 115*d*.

In an embodiment, when the first power connector 111 of the power supply 11 is being detached and removed from the second power connector 121 of the power cable 12, the first detecting terminal 111*e* of the first power connector 111 will be detached from and disconnected with the second detecting terminal 121*e* of the second power connector 121 firstly. At this moment, the first detecting terminal 111*e* of the first power connector 111 provides a first detecting signal $V_{s1}'$ under a disable status, for example high voltage level 3.3V, to the connection status detection circuit 114 via the connection path of the first connection pin 115*e*, the second connection pin 101*e*, the second detecting pin 101*d* and the first detecting pin 115*d*. Correspondingly, the connection status detection circuit 114 generates a power connection status signal $V_a$ (i.e. the signal level is high at the moment) under a disable status in response to the first detecting signal $V_{s1}'$ to the control unit 113. Therefore, the control unit 113 determines that the first power connector 111 is detached from and disconnected with the second power connector 121 or the user would like to separate the first power connector 111 with the second power connector 121 according to the connection status signal $V_a$ (i.e. the signal level was changed from low to high) and controls the power conversion circuit 112 not to generate or output the output voltage $V_o$. Therefore, there is no electric current flowing between the contacts of the power connectors 111, 121. Thereafter, the power terminals 121*b*~121*d* of the second power connector 121 will be detached from and disconnected with the power terminals 111*b*~111*d* of the first power connector 111 so that the generation of arc flash between the contacts of the power connectors will be prevented and the damages to the power supply or the data-processing system will be prevented.

In an embodiment, when the first hot-plug connector 115 is being detached and removed from the second hot-plug connector 101, the first detecting pin 115*d* of the first hot-plug connector 115 will be detached from and disconnected with the second detecting pin 101*d* of the second hot-plug connector 101 and the first connection pin 115*e* of the first hot-plug connector 115 will be detached from and disconnected with the second connection pin 101*e* of the second hot-plug connector 101, firstly. At this moment, the first detecting pin 115*d* of the first hot-plug connector 115 provides a second detecting signal $V_{s2}'$ under a disable status, for example high voltage level 3.3V. Correspondingly, the connection status detection circuit 114 generates a power connection status signal $V_a$ under a disable status in response to the second detecting signal $V_{s2}'$ to the control unit 113. Therefore, the control unit 113 determines that the first hot-plug connector 115 is detached from and disconnected with the second hot-plug connector 101 or the user would like to separate the first hot-plug connector 115 with the second hot-plug connector 101 according to the connection status signal $V_a$ and controls the power conversion circuit 112 not to generate or output the output voltage $V_o$. Therefore, there is no electric current flowing between the contacts of the hot-plug connectors 115, 101. Thereafter, the power pins 115*a*~115*c* of the first hot-plug connector 115 will be detached from and disconnected with the power pins 101*a*~101*c* of the second hot-plug connector 111 so that the generation of arc flash between the contacts of the hot-plug connectors will be prevented and the damages to the power supply or the data-processing system will be prevented.

In an embodiment, the connection of the second detecting pin 101*d* and the second connection pin 101*e* can be further coupled to a controller of the data-processing equipment 10 of the data-processing system 1 (not shown in FIG. 7). When the power supply 11 is coupled with the data-processing equipment 10 by the first hot-plug connector 115 and the second hot-plug connector 101 and when the second power connector 121 (i.e. plug) of the power cable 12 is coupled to the first power connector 111 (i.e. socket) of the power supply 11, the third power terminal 111*d* of the first power connector 111 will firstly contact with the third power terminal 121*d* of the second power connector 121. Then, the first power terminal 111*b* and the second power terminal 111*c* of the first power connector 111 will contact with the first power terminal 121*b* and the second power terminal 121*c* of the second power connector 121, respectively. Finally, the first detecting terminal 111*e* of the first power connector 111 will contact with the second detecting terminal 121*e* of the second power connector 121. Namely, when the first power connector 111 is coupled with the second power connector 121, the power and signal connecting and delivering between the first power connector 111 and the second power connector 121 will be the power ground, the positive voltage and the negative voltage, and the first detecting signal $V_{s1}'$ (i.e. PS_Kill) in sequence. Due to the second connection pin 101*e* is connected to the second detecting pin 101*d*, the second connection pin 101*e* also has the same voltage level with the second detecting pin 101*d* when the second power connector 121 (i.e. plug) is coupled to the first power connector 111 (i.e. socket) and the first hot-plug connector 115 is coupled to the second hot-plug connector 101. Accordingly, the control unit 113 will receive the connection status signal $V_a$ or the data-processing equipment 10 will receive the detecting signal (i.e. PS_Kill signal), which is an enabled status (i.e. under low_level). In this situation, the power supply 11 of the data-processing system 1 is working (i.e. under on status) and operating, and the electric current will pass through from the first power terminal 121*b* and the second power terminal 121*c* of the second power connector 121 to the first power terminal 111*b* and the second power terminal 111*c* of the first power connector 111.

In addition, when the data-processing equipment 10 is supplied power by the power supply 11, and when the second power connector 121 is abnormal to be pulled out from the first power connector 111, the first detecting terminal 111*e* of the first power connector 111 will be detached form and disconnected with the second detecting terminal 121*e* of the second power connector 121 firstly so that the detecting signal (i.e. PS_Kill signal) will be interrupted and the auxiliary voltage $V_{cc}$ will be provided to the data-processing equipment 10 via the first detecting pin 115*d*, the second detecting pin 101*d*, the second connection pin 101*e* and the first connection pin 115*e* of the hot-plug connectors 115, 101. Accordingly, the data-processing equipment 10 of the data-processing system 1 detects that the second detecting pin 101*d* is under disable status (i.e. high_level). Accordingly, the control unit 113 is operative to change from a normal power output status to a stop-output status (i.e. under off status) immediately according to the disable status or the data-processing equipment 10 is operative to change from a normal on-loading status to a stop-loading status according to the disable status so that the electric current which passes through the first power terminal 121*b* and the second power terminal 121*c* of the second power connector 121 and the first power terminal 111*b* and the second power terminal 111*c* of the first power connector 111 will be decreased or zero. Therefore, when the control unit 113 of the power supply 11 or the data-processing equipment 10 detects that a connector of an external power source is detached or pulled out from a connector of a power supply thereof unintentionally or accidentally, the generation of arc flash between the contacts of the connectors will be prevented and the damages to the data-processing system will be prevented.

To sum up, the present invention provides a power supply with arc flash protection mechanism for preventing the generation of arc flash due to electric current flowing through the contacts of the connectors and avoiding damages to the power supply or the data-processing equipments due to the electric arc and unintentional or accidental interruption of power-supplying. In addition, the present invention also provides a power connector assembly capable of preventing the generation of arc flash due to electric current flowing through the contacts of the connectors and reducing the cost.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply with arc flash protection mechanism, comprising:
    a first power connector including a plurality of power terminals and a first detecting terminal, wherein said plural power terminals are configured to couple with a plurality of power terminals of a second power connector, and said first detecting terminal is configured to couple with a second detecting terminal of said second power connector and provide a detecting signal indicative of whether said second power connector is being disconnected with said first power connector;
    a power conversion circuit electrically coupled to said power terminals of said first power connector for receiving an input voltage and converting said input power into an output voltage;
    a control unit electrically coupled to said power conversion circuit for controlling the operation of said power conversion circuit; and
    a connection status detection circuit electrically coupled to said control unit and said first detecting terminal of said first power connector for generating a power connection status signal to said control unit according to said detecting signal;
    wherein when said first detecting terminal of said first power connector is disconnected with said second detecting terminal of said second power connector, said power connection status signal is under disable status and said control unit controls said power conversion circuit not to generate or output said output voltage to a load according to said power connection status signal.

2. The power supply according to claim 1 wherein said second power connector is disposed on an end of a power cable, which transmits said input power from a power distribution unit to said power supply.

3. The power supply according to claim 1 wherein said first power connector further comprises a first main body including a receptacle and an isolation partition disposed in said receptacle for isolating and separating said power terminals of said first power connector with each other.

4. The power supply according to claim 3 wherein said first detecting terminal of said first power connector has a contact portion extending outwardly from one inner sidewall of said receptacle of said first main body and has a connection portion extending outwardly from one external sidewall of said first main body, and the distance from an opening of said receptacle of said first main body to said contact portion of said first detecting terminal is longer than that from said opening of said receptacle of said first main body to the free ends of said power terminals of said first power connector.

5. The power supply according to claim 3 wherein said first detecting terminal of said first power connector has a contact portion extending outwardly from the outline of said isolation partition and has a connection portion extending outwardly from one external sidewall of said first main body, and the distance from an opening of said receptacle of said first main body to said contact portion of said first detecting terminal is longer than that from said opening of said receptacle of said first main body to the free ends of said power terminals of said first power connector.

6. The power supply according to claim 1 wherein said second power connector further comprises a second main body including a plurality of power terminal openings formed on a first surface thereof, and said power terminals of said second power connector are respectively disposed in a corresponding power terminal opening of said second main body.

7. The power supply according to claim 6 wherein said second detecting terminal has a contact portion extending outwardly from one external sidewall of said second main body, and the distance from an end of said second detecting terminal to the edge of said second main body is longer than that from the ends of said power terminals of said second power connector to said edge of said second main body.

8. The power supply according to claim 6 wherein said second power connector further comprises a receptacle, and said second detecting terminal has a contact portion extending outwardly from an inner sidewall of said receptacle of said second main body, and the distance from an end of said second detecting terminal to the opening of said receptacle of said second main body is longer than that from the ends of said power terminals of said second power connector to said power terminal openings of said second main body.

9. The power supply according to claim 1 wherein said first power connector comprises a first main body including a receptacle and a protrusion portion disposed in said receptacle; and said protrusion portion comprises a plurality of power terminal openings formed on a first surface thereof, and said power terminals of said first power connector are respectively disposed in a corresponding power terminal opening of said first main body.

10. The power supply according to claim 9 wherein said protrusion portion further comprises a receptacle, and said first detecting terminal has a contact portion extending outwardly from the inner sidewall of said receptacle of said protrusion portion and has a connection portion extending outwardly from one external sidewall of said first main body, wherein the distance from an end of said first detecting terminal to the opening of said receptacle of said protrusion portion is longer than that from the ends of said power terminals of said first power connector to said power terminal openings of said first power connector.

11. The power supply according to claim 1 wherein said second power connector further comprises a second main body including a receptacle, a sidewall and an isolation partition disposed in said receptacle for isolating and separating said power terminals with each other.

12. The power supply according to claim 11 wherein said second detecting terminal of said second power connector has a contact portion extending outwardly from the outline of said isolation partition of said second main body, and the distance from an opening of said receptacle of said second main body to said contact portion of said second detecting terminal is longer than that from said opening of said receptacle of said second main body to the free ends of said power terminals of said second power connector.

13. The power supply according to claim 1 wherein when said second power connector is coupled to said first power connector, said power terminals of said first power connector firstly contact with said power terminals of said second power connector, and said first detecting terminal of said first power connector contacts with said second detecting terminal of the second power connector subsequently.

14. The power supply according to claim 1 wherein when said second power connector is pulled out and removed from said first power connector, said first detecting terminal of said first power connector is detached from and disconnected with said second detecting terminal of said second power connector firstly, and said power terminals of said first power connector are disconnected with said power terminals of said second power connector subsequently.

15. The power supply according to claim 1 wherein said connection status detection circuit detects a power connection status of said first power connector and said second power connector and comprises a first pull-up resistor electrically connected between an auxiliary voltage and said first detecting terminal of said first power connector.

16. The power supply according to claim 1 wherein when said first power connector is disconnected with said second power connector, said first detecting terminal of said first power connector provides said detecting signal under said disable status that is used to detect when said first power connector is being removed or disconnected with said second power connector.

17. The power supply according to claim 1 wherein when said second power connector is coupled to said first power connector, and when said power terminals of said second power connector contact with said power terminals of said first power connector, and said first detecting terminal of said first power connector is disconnected with said second detecting terminal of said second power connector, said detecting signal and said power connection status signal are under disable statuses, and said control unit controls said power conversion circuit not to generate or output said output voltage according to said power connection status signal.

18. The power supply according to claim 17 wherein when said second power connector is coupled to said first power connector, and when said first detecting terminal of said first power connector contacts with said second detecting terminal of said second power connector, said detecting signal and said power connection status signal are changed from said disable statuses to enabled statuses and said control unit controls said power conversion circuit to operate to generate or output the output voltage according to said power connection status signal.

19. The power supply according to claim 18 wherein when said second power connector is being detached and removed from said first power connector, and when said second detecting terminal of said second power connector is detached from and disconnected with said first detecting terminal, and said power terminals of said second power connector contact with said power terminals of said first power connector, said detecting signal and said power connection status signal is changed from said enabled statuses to said disable statuses, and said control unit controls said power conversion circuit not to operate to generate or output said output voltage according to said power connection status signal.

20. The power supply according to claim 1, further comprising a first hot-plug connector comprising a plurality of power pins and electrically coupled to said power conversion circuit, wherein said power pins of said first hot-plug connector are configured to couple with a plurality of power pins of a second hot-plug connector of said load.

21. The power supply according to claim 20 wherein said first hot-plug connector further comprises a first detecting pin, and said second hot-plug connector further comprises a second detecting pin configured to couple with the first detecting pin of said first hot-plug connector.

22. The power supply according to claim 21 wherein when said first hot-plug connector is being coupled with said second hot-plug connector, said power pins of said first hot-plug connector firstly contact with said power pins of said second hot-plug connector, and said first detecting pin of said first hot-plug connector contacts with said second detecting pin of said second hot-plug connector subsequently.

23. The power supply according to claim 21 wherein when said first hot-plug connector is being detached from and disconnected with said second hot-plug connector, said first detecting pin of said first hot-plug connector is detached from and disconnected with said second detecting pin of said second hot-plug connector firstly, and said power pins of said first hot-plug connector are detached from and disconnected with said power pins of said second hot-plug connector subsequently.

24. The power supply according to claim 21 wherein said connection status detection circuit comprises:
 a first pull-up resistor;
 a second pull-up resistor electrically coupled between an auxiliary voltage and said first detecting pin of said first hot-plug connector; and
 an OR logic circuit having an output terminal electrically coupled to said control unit, a first input terminal electrically coupled to said first detecting terminal of said first power connector, and a second input terminal electrically coupled to said first detecting pin of said first hot-plug connector.

25. The power supply according to claim 24 wherein when said first hot-plug connector is detached from and disconnected with said second hot-plug connector, said first detecting pin of said first hot-plug connector generates another detecting signal under the disable status and said connection status detection circuit generates said power connection status signal under said disable status to said control unit in response to said another detecting signal, and said control unit determines that said first hot-plug connector is detached from and disconnected with said second hot-plug connector according to said power connection status signal and controls said power conversion circuit not to generate or output said output voltage.

26. The power supply according to claim 1 wherein said load is a data-processing equipment of a data center.

27. A power connector assembly, comprising:
 a first power connector including a plurality of power terminals and a first detecting terminal, wherein said plurality of power terminals are electrically coupled to a power conversion circuit; and
 a second power connector configured to couple with said first power connector and including a plurality of power terminals and a second detecting terminal;
 wherein said plural power terminals of said first power connector are configured to couple with said plural power terminals of said second power connector, and said first detecting terminal of said first power connector is configured to couple with said second detecting terminal of said second power connector and provide a detecting signal indicative of whether said second power connector is being disconnected with said first power connector, wherein when said second power connector is disconnected with said first power connector, said power conversion circuit is controlled not to generate or output said output voltage to a load according to said detecting signal.

28. The power connector assembly according to claim 27 wherein said first power connector further comprises a first main body including a receptacle and an isolation partition disposed in said receptacle for isolating and separating said power terminals of said first power connector with each other.

29. The power connector assembly according to claim 28 wherein said first detecting terminal of said first power connector has a contact portion extending outwardly from one inner sidewall of said receptacle of said first main body and has a connection portion extending outwardly from one external sidewall of said first main body, and the distance from an opening of said receptacle of said first main body to said contact portion of said first detecting terminal is longer than that from said opening of said receptacle of said first main body to the free ends of said power terminals of said first power connector.

30. The power connector assembly according to claim 28 wherein said first detecting terminal of said first power connector has a contact portion extending outwardly from the outline of said isolation partition and has a connection portion extending outwardly from one external sidewall of said first main body, and the distance from an opening of said receptacle of said first main body to said contact portion of said first detecting terminal is longer than that from said opening of said receptacle of said first main body to the free ends of said power terminals of said first power connector.

31. The power connector assembly according to claim 27 wherein said second power connector further comprises a second main body including a plurality of power terminal openings formed on a first surface thereof, and said power terminals of said second power connector are respectively disposed in a corresponding power terminal opening of said second main body.

32. The power connector assembly according to claim 31 wherein said second detecting terminal has a contact portion extending outwardly from one external sidewall of said second main body, and the distance from an end of said second detecting terminal to the edge of said second main body is longer than that from the ends of said power terminals of said second power connector to said edge of said second main body.

33. The power connector assembly according to claim 31 wherein said second power connector further comprises a receptacle, and said second detecting terminal has a contact portion extending outwardly from an inner sidewall of said receptacle of said second main body, and the distance from an end of said second detecting terminal to the opening of said receptacle of said second main body is longer than that from the ends of said power terminals of said second power connector to said power terminal openings of said second main body.

34. The power connector assembly according to claim 27 wherein said first power connector comprises a first main body including a receptacle and a protrusion portion disposed in said receptacle; and said protrusion portion comprises a plurality of power terminal openings formed on a first surface thereof, and said power terminals of said first power connector are respectively disposed in a corresponding power terminal opening of said first main body.

35. The power connector assembly according to claim 34 wherein said protrusion portion further comprises a receptacle, and said first detecting terminal has a contact portion extending outwardly from the inner sidewall of said receptacle of said protrusion portion and has a connection portion extending outwardly from one external sidewall of said first main body, wherein the distance from an end of said first detecting terminal to the opening of said receptacle of said protrusion portion is longer than that from the ends of said power terminals of said first power connector to said power terminal openings of said first power connector.

36. The power connector assembly according to claim 27 wherein said second power connector further comprises a second main body including a receptacle, a sidewall and an isolation partition disposed in said receptacle for isolating and separating said power terminals with each other.

37. The power connector assembly according to claim 36 wherein said second detecting terminal of said second power connector has a contact portion extending outwardly from the outline of said isolation partition of said second main body, and the distance from an opening of said receptacle of said second main body to said contact portion of said second detecting terminal is longer than that from said opening of said receptacle of said second main body to the free ends of said power terminals of said second power connector.

38. A power supply with arc flash protection mechanism for providing power to a load, comprising:
  a first power connector including a plurality of power terminals and a first detecting terminal, wherein said plural power terminals are configured to couple with a plurality of power terminals of a second power connector, and said first detecting terminal is configured to couple with a second detecting terminal of said second power connector and provide a detecting signal indicative of whether said second power connector is being disconnected with said first power connector;
  a power conversion circuit electrically coupled to said power terminals of said first power connector for receiving an input voltage and converting said input power into an output voltage;
  a first hot-plug connector electrically coupled to said power conversion circuit and including a plurality of power pins, a first detecting pin and a first connection pin, wherein said plural power pins are configured to couple with a plurality of power pins of a second hot-plug connector of said load, said first detecting pin is configured to couple with a second detecting pin of said second hot-plug connector, said first connection pin is configured to couple with a second connection pin of said second hot-plug connector, and said second detecting pin is connected with said second connection pin;
  a control unit electrically coupled to said power conversion circuit for controlling the operation of said power conversion circuit; and
  a connection status detection circuit electrically coupled to said control unit and electrically coupled to said first detecting terminal of said first power connector via a connection loop of said first connection pin, said second connection pin, said second detecting pin and said first detecting pin for generating a power connection status signal to said control unit according to said detecting signal;
  wherein when said first detecting terminal of said first power connector is disconnected with said second detecting terminal of said second power connector or said first hot-plug connector is disconnected with said second hot-plug connector, said power connection status signal is under disable status and said control unit controls said power conversion circuit not to generate or output said output voltage to said load according to said power connection status signal.

39. The power supply according to claim 38 wherein said connection status detection circuit comprises a pull-up resistor electrically coupled between an auxiliary voltage and said first detecting pin of said first hot-plug connector.

40. A data-processing system, comprising:

a data-processing equipment; and a power supply electrically coupled to said data-processing equipment and comprising:

a first power connector including a plurality of power terminals and a first detecting terminal, wherein said plural power terminals are configured to couple with a plurality of power terminals of a second power connector, and said first detecting terminal is configured to couple with a second detecting terminal of said second power connector and provide a detecting signal indicative of whether said second power connector is being disconnected with said first power connector;

a power conversion circuit electrically coupled to said power terminals of said first power connector for receiving an input voltage and converting said input power into an output voltage;

a control unit electrically coupled to said power conversion circuit for controlling the operation of said power conversion circuit; and a connection status detection circuit electrically coupled to said control unit and electrically coupled to said first detecting terminal of said first power connector for generating a power connection status signal to said control unit according to said detecting signal;

wherein when said first detecting terminal of said first power connector is disconnected with said second detecting terminal of said second power connector, said power connection status signal is under disable status and said control unit controls said power conversion circuit not to generate or output said output voltage to said data-processing equipment according to said power connection status signal.

* * * * *